No. 765,571. PATENTED JULY 19, 1904.
L. F. FERRELL.
PASTRY TESTER.
APPLICATION FILED APR. 9, 1904.
NO MODEL.

Witnesses
Geo. Ackman Jr.
Frank B. Hoffman

Inventor
Lena F. Ferrell,
By Victor J. Evans
Attorney

No. 765,571. Patented July 19, 1904.

UNITED STATES PATENT OFFICE.

LENA FRANCIS FERRELL, OF INDEPENDENCE, KANSAS.

PASTRY-TESTER.

SPECIFICATION forming part of Letters Patent No. 765,571, dated July 19, 1904.

Application filed April 9, 1904. Serial No. 202,475. (No model.)

*To all whom it may concern:*

Be it known that I, LENA FRANCIS FERRELL, a citizen of the United States, residing at Independence, in the county of Montgomery and State of Kansas, have invented new and useful Improvements in Pastry-Testers, of which the following is a specification.

This invention relates to combination kitchen implements, the special object of the invention being to provide a tester for cakes, puddings, and the like to ascertain the condition of the same at different periods in the cooking operation, the implement also comprising a pick for removing corks or stoppers from bottles, picking nuts, and performing analogous operations.

With the above and other objects in view the invention consists in the novel construction, combination, and arrangement of parts, as hereinafter fully described, illustrated, and claimed.

Figure 1:
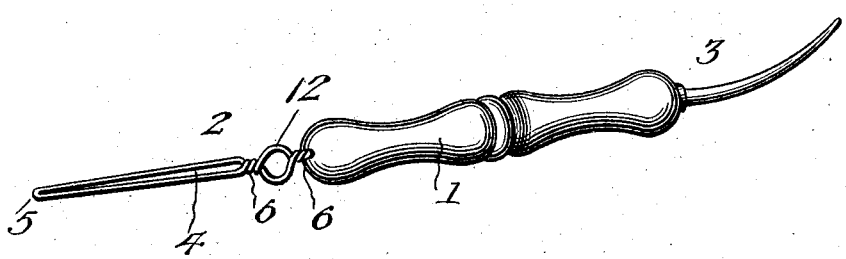
Figure 2:
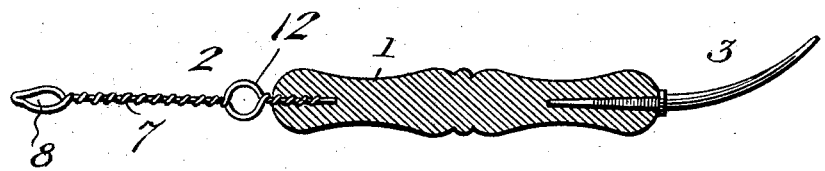
Figure 3:
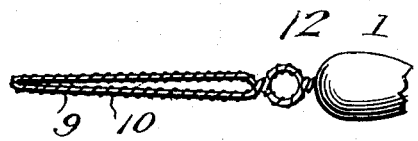

In the accompanying drawings, Figure 1 is a perspective view of the testing implement under the preferred embodiment of the present invention. Fig. 2 is a longitudinal section through the same, showing a modified form of testing-prong. Fig. 3 is a fragmentary plan view showing another form of testing-prong.

Like reference-numerals designate corresponding parts in all the figures.

Referring to the drawings, 1 designates a handle of any suitable shape, to one end of which is connected a testing-prong 2 and to the opposite end of which is attached a pick 3, preferably of curved form and provided with a pointed extremity, adapting it to extract corks or stoppers from bottles, cleaning mills for grinding food, and picking nuts, &c. The testing-prong 2 is preferably composed of a suitable length of wire which is bent in such manner as to form one or more pockets 4, adapted to receive a small portion of the cake or pudding into which the prong is thrust, such portion of the article being removed with and upon the withdrawal of the prong.

In the preferred embodiment of the invention the wire is bent centrally to form the point 5 of the prong, the side portions of the wire diverging thence toward the handle and being twisted upon each other, as shown at 6, and then inserted in and detachably connected to the handle. Instead of forming the prong in the manner shown in Fig. 1 said prong may be formed as shown in Fig. 2, in which the return portions of the wire are twisted one around the other to form a number of small pockets 7 and a relatively large terminal pocket 8.

Another arrangement is shown in Fig. 3, in which a smaller wire 9 is wrapped around the diverging portions of the main wire so as to form a large number of small pockets 10.

Under either of the constructions illustrated in the drawings the testing-prong is provided with one or more pockets adapted to receive a portion of the material of the cake, pudding, or the like and extract the same upon the withdrawal of the prong from the cake or pudding after it has been thrust into the same.

I wish it to be understood that I provide the tester with a ring 12, which is formed between the two twists of the wire, by means of which said ring serves the purpose of a bearing to permit of the twisted tang next the ring being turned in the opening of the handle by the fingers of a person or by inserting a suitable implement in the opening of the ring for the purpose of connecting the tang and handle together, said ring further serving to add strength to the tester.

Having thus described the invention, what is claimed as new is—

1. A pastry-tester comprising a handle having a connecting-opening therein, a twisted wire prong having an opening to form a pocket at the other end of the twist, a screw-tang formed by a twist of the wire on the other end of the tester, and a ring formed between the twists which serves to detachably connect the tang to the opening of the handle.

2. A pastry-tester comprising diverging prongs constructed of wire decreasing in size outwardly to form a pointed end, a ring at the inner end of the prongs, a tang formed on the ring, a wire of smaller dimension spirally wound around the prongs, ring and tang, said tang adapted to be connected to a suitable handle by means of said ring, substantially as specified.

In testimony whereof I affix my signature in presence of two witnesses.

LENA FRANCIS FERRELL.

Witnesses:
  W. W. FERRELL,
  ADDA B. CAVERT.